March 1, 1966

I. KENT ETAL 3,238,109

FUEL ELEMENTS FOR NUCLEAR REACTORS

Filed Feb. 3, 1960

4 Sheets-Sheet 1

INVENTORS
IVOR KENT
GORDON PACKMAN
PETER WAINE

BY

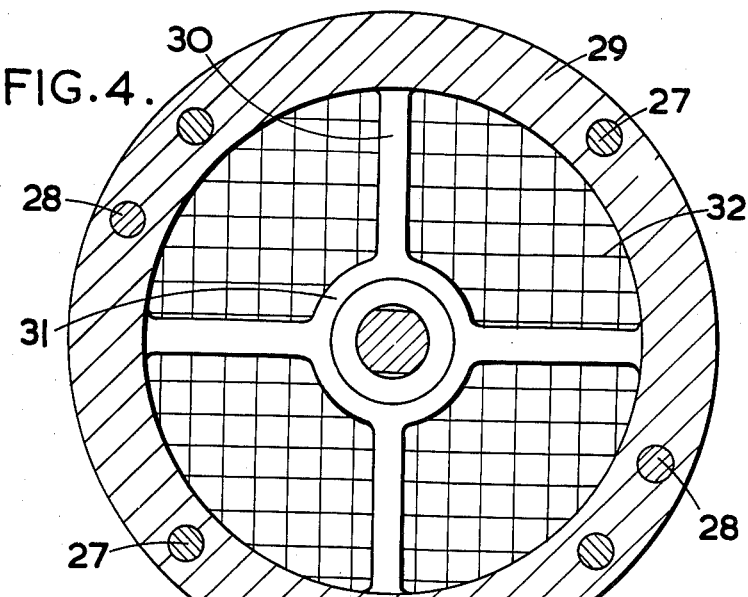
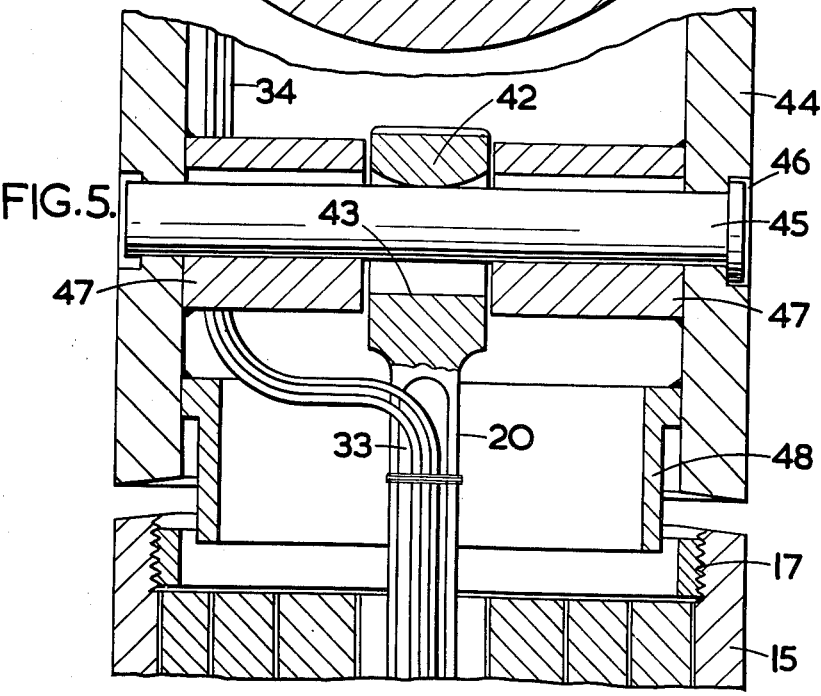

March 1, 1966  I. KENT ETAL  3,238,109
FUEL ELEMENTS FOR NUCLEAR REACTORS
Filed Feb. 3, 1960  4 Sheets-Sheet 4

INVENTORS
IVOR KENT
GORDON PACKMAN
PETER WAINE

BY

3,238,109
FUEL ELEMENTS FOR NUCLEAR REACTORS

Ivor Kent and Gordon Packman, Culcheth, Lancashire, and Peter Waine, Padgate, Warrington, England, assignors to United Kingdom Atomic Energy Authority, London, England
Filed Feb. 3, 1960, Ser. No. 6,427
Claims priority, application Great Britain, Feb. 3, 1959, 3,745/59
9 Claims. (Cl. 176—78)

This invention relates to fuel elements for nuclear reactors.

An object of the invention is to provide an improved fuel element suitable for use in a gas-cooled nuclear reactor designed to operate at temperatures of the order of 500–600° C.

A fuel element according to the invention comprises stacks of clusters of sheathed nuclear fuel members, said sheathed members being located at both ends in support plates so that their weight is carried from one end and the other end is free to expand; annular spacers for the support plates such that the assemblage of sheathed members, plates and spacers forms a self-supporting body; a graphite sleeve supporting said body from one end; and a central aperture in said support plates so that the fuel element can be threaded together with other elements on to a rod for lifting and lowering of an assembly of fuel elements.

Means are preferably provided for releasable attachment to the lower end of a fuel element, said means serving for support of the element by the said rod when the element forms the lowermost of an assembly of elements threaded on to the rod.

The invention furthermore includes an assembly comprising a plurality of fuel elements threaded in stacked manner on to a central rod, the lowermost fuel element being supported from the lower end of the said rod, whereby the assembly can be removed from or inserted in a fuel element channel by lifting or lowering the said rod.

The upper end of the said rod of an assembly of fuel elements may be secured to a tubular member forming a distance piece secured to a further member, for example a shield plug, and disposed between the assembly of fuel elements and the further member.

Figure 1:
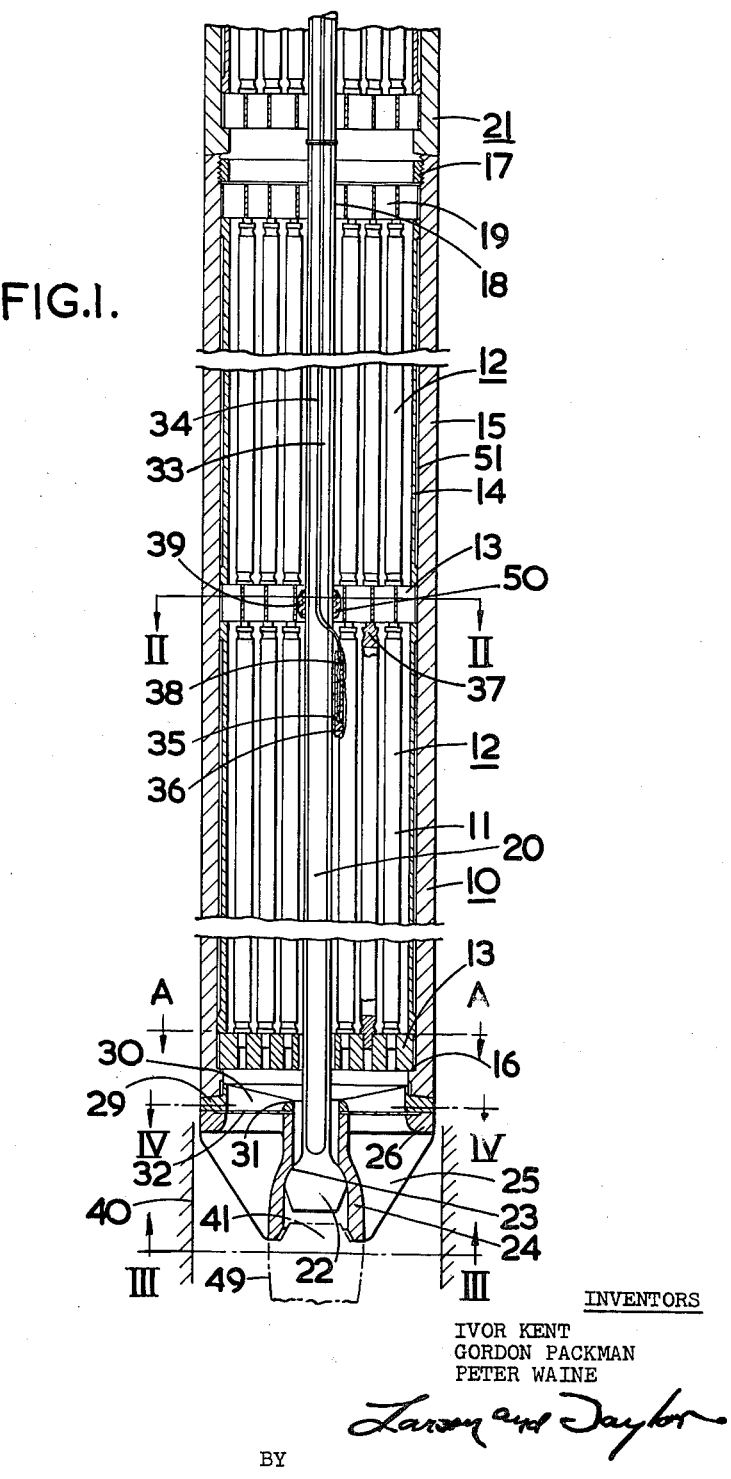
Figure 2:
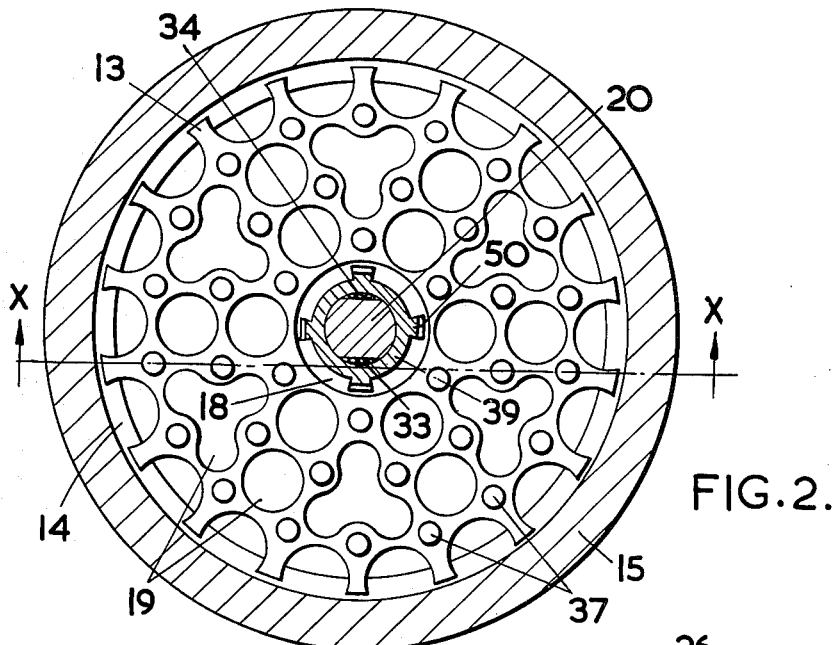
Figure 3:
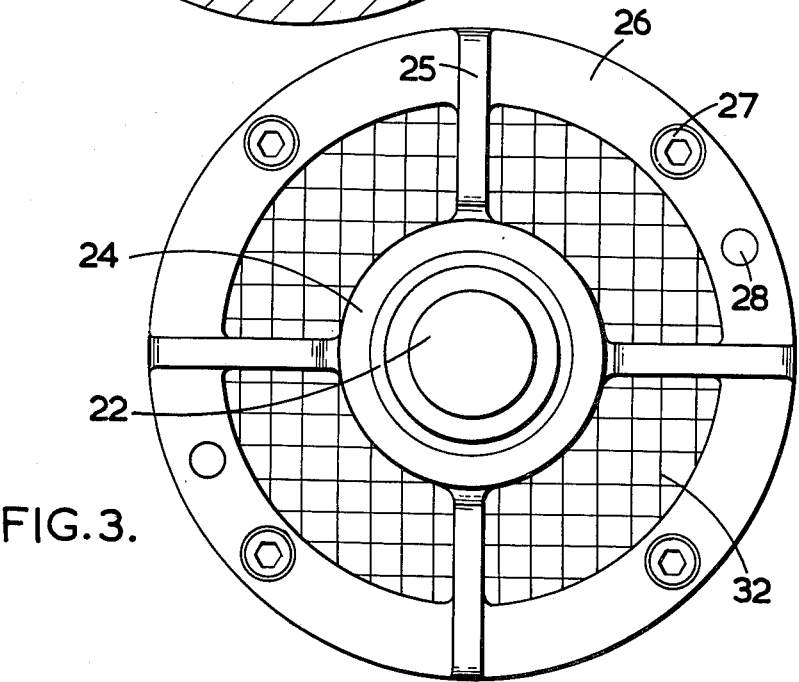
Figure 6:
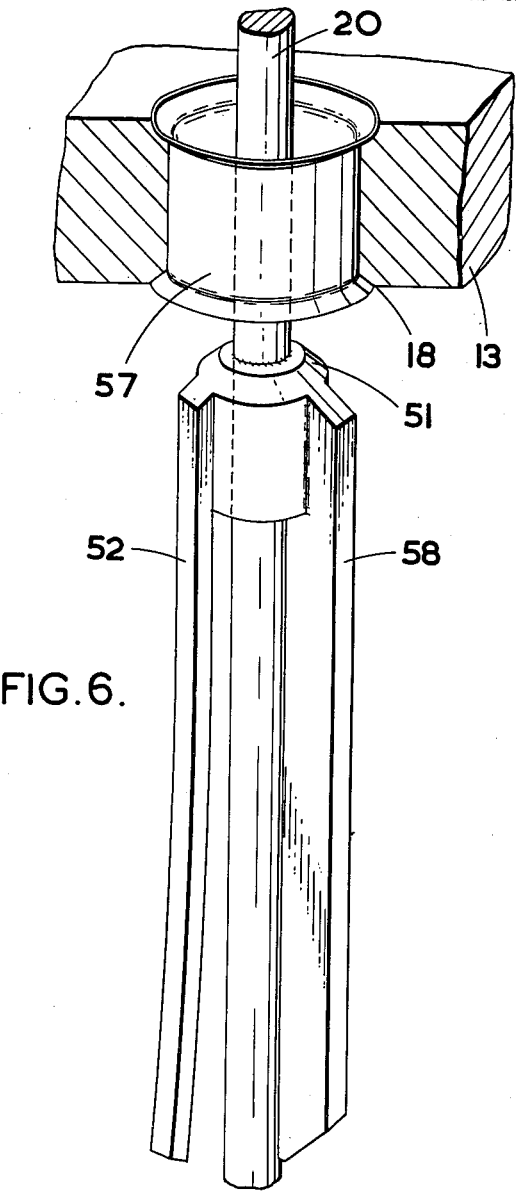
Figure 7:
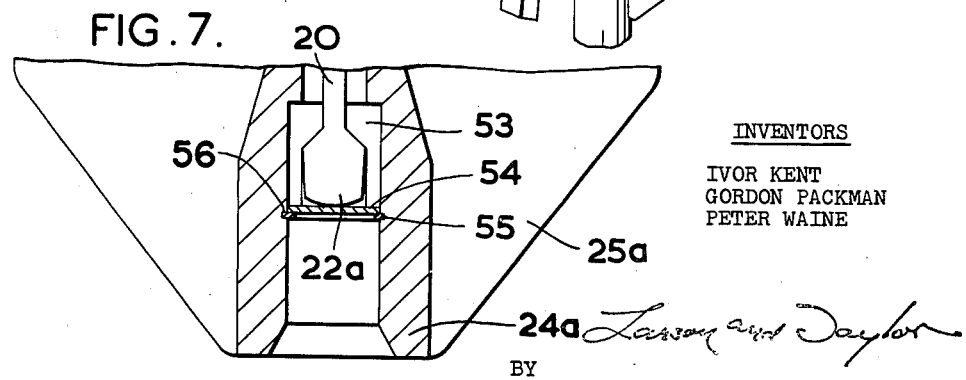

A constructional example embodying the invention will now be described with reference to the accompanying drawings, wherein:

FIGURE 1 is a side view mainly in medial section with the part below A—A sectioned on a line corresponding to line X—X of FIG. 2;
FIGURE 2 is a section on the line II—II of FIG. 1;
FIGURE 3 is a plan view from beneath;
FIGURE 4 is a section on the line IV—IV of FIG. 1;
FIGURE 5 is a side elevation partly in medial section;
FIGURE 6 is an exploded view illustrating a modification; and
FIGURE 7 is a medial section illustrating a further modification.

In FIG. 1 is shown a fuel element 10 comprising sheathed nuclear fuel members 11, conveniently of uranium dioxide sheathed in beryllium, arranged in three clusters 12 which are stacked one upon another. The sheathed nuclear fuel members 11 carry beryllium end plugs 37 by which they are located at both ends in beryllium support plates 13. The plates 13 are spaced apart by annular graphite spacers 14 so that the weight of the fuel members 11 is carried by the support plates at their lower ends and their upper ends are free to expand, yet the assembly of sheathed members 11, support plates 13 and annular spacers 14 forms a self-supporting body. A graphite sleeve 15 surrounds this self-supporting body and has at its lower end an annular shoulder 16, formed either as an integral part of the sleeve 15 or by a ring secured thereto, on which the body is supported. The graphite spacers 14 are spaced from the interior of the graphite sleeve 15 over the greater part of their length, forming an annular space 51 which serves for thermal insulation of the graphite sleeve 15 whereby a coolant fraction can be arranged to flow in an annular space between the exterior of the graphite sleeve 15 and the wall of a fuel element channel in the moderator for cooling the moderator, for example as described in copending applications Nos. 821,493 or 835,523. A retaining ring 17 of graphite is screwed into or otherwise secured in the upper end of the sleeve 15. A clearance is left between the uppermost support plate 13 and the retaining ring 17 so as to allow for differential expansion of the beryllium support plates 13, the graphite sleeve 15 and graphite spacers 14. The support plates 13 (shown more clearly in FIG. 2) each have a central aperture 18 and a number of other apertures 19 which allow coolant flow along the fuel element in contact with the fuel members 11. A generally cylindrical stainless steel lifting member or rod 20 shown enlarged for the sake of clarity is threaded through the central apertures 18. Ceramic sleeves 39 fitted on to the rod 20 at intervals have ribs 50 engaging the walls of apertures 18 and serve to prevent contact between the rod 20 and the beryllium support plates 13. The rod 20 extends beyond the fuel element so that other fuel elements may also be threaded on it to form a string of fuel elements rigidly connected together by the rod. Part of a second fuel element 21 is shown in FIG. 1. The rod 20 has at its lower end a boss 22 which fits in a stepped recess 23 in a bush 24, carried by webs 25 on a ring 26 and located in a nuclear reactor fuel element channel 40 about a spigot 41 projecting from a stool 49. The ring 26 is fastened by screws 27 and dowels 28 (FIGS. 3 and 4) to another ring 29 with ribs 30 carrying a central boss 31. A wire gauze 32 is clamped between the two rings to retain any debris from the fuel members and to filter solids from the coolant. The ring 29 is screwed into the sleeve 15, and the ring 29 together with the ring 26 and its bush 24 forms a sleeve support means which supports the fuel element or stack of fuel elements above it by way of the sleeve 15 so that the fuel element or stack of fuel elements can be lifted or lowered by lifting or lowering the rod 20. Thus fuel elements can be simply inserted in and withdrawn from a fuel element channel in a nuclear reactor.

The rod 20 is provided with longitudinal flats or relievings 33 for accommodation of thermocouple cables 34 extending to any desired fuel member 11. Only one cable 34 is shown in FIG. 1 for the sake of clarity. This cable terminates in a hot junction 35 embedded in a raised portion 36 on the sheath 38 of a nuclear fuel member 11. The sleeve 39 assists in maintaining the cable or cables 34 in position. The upper end of the rod 20 (shown in FIG. 5) terminates in a boss 42 having a shaped bore 43. The rod is secured to a tubular member 44 by a bolt 45 which passes through the shaped bore 43, with clearance to allow for upward expansion of the rod 20, and apertures 46 in the tubular member 44. A sleeve 47 is welded to the inside of the tubular member 44 about the aperture 46 for location of the boss 42 in an axial position. A flanged sleeve 48 is also welded inside the tubular member 44 to assist in location of the tubular member 44 with respect to the adjacent element 10. The tubular member 44 can be secured to a shield plug to provide a complete assembly for loading into a fuel element channel in a nuclear reactor as a single unit.

The single rod 20 linking a stack of fuel elements together takes up very little space in the fuel elements. Only the centre fuel member in a concentric pitching of fuel members has to be sacrificed to accommodate the rod. It is also an advantage that, during lifting and lowering, the rod 20 is in tension whilst the remainder of the assembly, particularly the graphite sleeves 15, is in compression. Furthermore, due to the fuel elements being stacked upon one another when constituted into an assembly, their ends, which are relieved as can clearly be seen in FIGURE 1, rest upon one another in a sealing manner and largely prevent coolant flowing within the elements from passing outwardly to the annulus between the graphite sleeves of an assembly and the wall of a fuel element channel containing it. Alternatively, adjacent graphite sleeves 15 may be interconnected by spigots, for example, the better to prevent outward coolant flow between sleeve ends whilst allowing slight flexibility at the joints.

In an alternative arrangement shown in FIG. 6 the ceramic sleeves 39 are replaced by resilient locating means. Each means comprises a Nimonic alloy bush 51 welded to the rod 20 and carrying a support leg 58 and two leaf springs 52 (of which only one is shown) the support leg and springs being symmetrically disposed around the bush 51. Central apertures 18 in the support plates 13 are provided with stainless steel liners 57 chromised where they are in contact with the beryllium of the support plates 13 and the fuel element is assembled by drawing the rod 20 and the bush 51 up through the liner 57 so that the springs 52 contact the liners 57 and locate the rod 20 relative to the support plates 13. Thereby contact between the stainless steel rod and the beryllium support plates is avoided and vibration of the rod under reactor coolant flow is reduced.

In FIG. 6 the rod 20 is shown to scale and without flats 33 to accommodate thermocouple cables. As an alternative thermocouple cables may be led down the inside of the graphite sleeve 15.

A further modification is shown in FIG. 7. As shown in FIG. 7 the rod 20 has at its lower end a boss 22a which is small enough to pass through the apertures 18 and allow the rod to be threaded down through a stack of fuel elements. Around the boss 22a is provided a split collet 53, held in position in a bush 24a having webs 25a by a retaining disc 54 and a circlip 55 which is fitted in a groove 56 in the boss 24a after the rod 20 has been threaded through the fuel element stack and the collet 53 has been placed around the boss 22a.

The lifting rod 20 may be of beryllium instead of stainless steel.

We claim:

1. In a nuclear fuel element of the kind comprising an upright hollow graphite sleeve removably supported in a reactor fuel rods element channel, and nuclear fuel rods disposed within and carried by the sleeve, the improvement comprising sleeve support means attached to the sleeve adjacent the lower end of the sleeve; a single lifting member extending lengthwise up through the center of the sleeve and attached only at its lower end to the sleeve support means, the single lifting member including means at its upper end for raising and lowering the lifting member to correspondingly raise and lower the sleeve supporting means and sleeve from adjacent the said lower end to avoid subjecting the sleeve to tensile forces; and a fuel rod support member separate from the sleeve support member and carrying nuclear fuel rods by their lower ends, said fuel rod support member being supported directly by the lower end of the sleeve, and said single lifting member extending freely through an aperture in said fuel rod support member.

2. The improvement according to claim 1 wherein the sleeve is supported in the fuel element channel by the sleeve support means.

3. A fuel element according to claim 1 wherein the lifting member is made of steel.

4. A fuel element according to claim 1 wherein a ceramic sleeve is mounted coaxially on the lifting member within the sleeve and in register with said fuel rod support member to prevent contact of the lifting member with said fuel rod support member.

5. In a nuclear fuel element of the kind comprising an upright hollow graphite sleeve removeably supported in a reactor fuel element channel, and nuclear fuel rods disposed within and carried by the sleeve, the improvement comprising sleeve support means attached to the sleeve adjacent the lower end of the sleeve, said sleeve supporting means comprising an annular ring supporting the sleeve and a central bush defining a stepped recess; a single lifting member extending lengthwise up through the center of the sleeve and attached only at its lower end to the sleeve support means, said lifting member including an enlarged boss fitting into the stepped recess of said central bush, the single lifting member also including means at its upper end for raising and lowering the lifting member to correspondingly raise and lower the sleeve support means and sleeve from adjacent the said lower end to avoid subjecting the sleeve to tensile forces.

6. A fuel element comprising an uprightly disposed graphite sleeve; a cluster of elongate fuel members disposed upright in parallel array within the sleeve; means carried by said sleeve to support the fuel members; a lifting member freely extending lengthwise up through the center of the sleeve and beyond said cluster; and sleeve support means supporting the sleeve disposed at the lower end of the sleeve and connected to the lower end only of the lifting member, said lifting member including means at its upper end to raise and lower the fuel element by the sleeve support means and thereby avoid subjecting the sleeve to tensile forces, and said sleeve support means comprising a ring coaxial with and adjacent to the lower end of the sleeve and a bush on the axis of the ring connecting the ring to the lifting member.

7. A fuel element according to claim 6 wherein the bush defines an internal stepped recess on the said axis, and the lifting member includes an enlarged boss fitting in the stepped recess.

8. A fuel element according to claim 7 and further comprising a collet within the recess and surrounding the boss, and a returning disc within the recess holding the collet and boss within the recess.

9. A fuel element according to claim 6 wherein the bush defines the central bore, and the lifting member passes through the bore and includes spring means disposed thereon below the bush, the spring means engaging the wall of the bore to connect the lifting member to the bush.

References Cited by the Examiner

UNITED STATES PATENTS

| | | | |
|---|---|---|---|
| 2,841,545 | 7/1958 | Zinn | 176—18 |
| 2,848,404 | 8/1958 | Treshow | 176—44 |
| 2,851,410 | 9/1958 | Vernon et al. | 176—31 |
| 2,852,456 | 9/1958 | Wade | 176—18 |
| 2,938,848 | 5/1960 | Ladd et al. | 176—72 |
| 2,985,575 | 5/1961 | Dennis et al. | 176—43 |
| 2,999,059 | 9/1961 | Treshow | 176—42 |
| 3,015,616 | 1/1962 | Sturtz et al. | 176—78 |
| 3,090,742 | 5/1963 | Fawcett | 176—20 |
| 3,128,235 | 4/1964 | Hackney et al. | 176—78 |

CARL D. QUARFORTH, *Primary Examiner.*

ROGER L. CAMPBELL, *Examiner.*